United States Patent [19]

Lythgoe

[11] 3,876,436

[45] Apr. 8, 1975

[54] ALUMINO-PHOSPHATE PHOTOCHROMIC GLASSES

[75] Inventor: Stanley Lythgoe, Newburgh near Parbold, England

[73] Assignee: Pilkington Brothers Limited, Liverpool, England

[22] Filed: July 12, 1972

[21] Appl. No.: 271,091

[30] Foreign Application Priority Data

July 12, 1971   United Kingdom............... 32653/71
Feb. 22, 1972   United Kingdom................. 8168/72
Mar. 30, 1972   United Kingdom............... 15101/72

[52] U.S. Cl............. 106/47 R; 106/DIG. 6; 106/52; 106/53; 106/54
[51] Int. Cl............................ C03c 3/26; C03c 3/16
[58] Field of Search........... 106/DIG. 6, 47 Q, 47 R, 106/52, 54, 53; 65/30, 33

[56] References Cited
UNITED STATES PATENTS

| | | | |
|---|---|---|---|
| 2,532,386 | 12/1950 | Armistead | 106/54 X |
| 3,208,860 | 9/1965 | Armistead et al. | 106/52 |
| 3,374,381 | 3/1968 | Albinak et al. | 106/DIG. 6 |
| 3,419,370 | 12/1968 | Cramer et al. | 106/52 |
| 3,615,761 | 10/1971 | Sakka | 106/54 |
| 3,656,923 | 4/1972 | Garfinckel et al. | 106/DIG. 6 |
| 3,703,388 | 11/1972 | Araujo et al. | 106/47 R |

OTHER PUBLICATIONS

Galakhova, G. S. et al., "Effect of the Type of Glass-Forming Compounds on the State of Light–Sensitive Components in Glass," Item 123146s, Chem. Abstracts, 73, (1970) pg. 188.

Fanderlik, Ivan, Czech. Patent 125,536, Chem. Abstracts, Item 69460s, Vol. 69, (Oct. 28, 1968), p. 6500.

Primary Examiner—Winston A. Douglas
Assistant Examiner—Mark Bell
Attorney, Agent, or Firm—Sughrue, Rothwell, Mion, Zinn & Macpeak

[57] ABSTRACT

Photochromic glass compositions which darken on exposure to actinic radiation are made with a phosphate base (at least 17 wt.% $P_2O_5$) and silver halide crystals dispersed through the glass, the total silver content being at least 0.05 wt.%. The glasses generally also contain $SiO_2$ (0 to 40 wt.%) and $Al_2O_3$ (9 to 34 wt.%). The preferred ranges, in weight percentage on the oxide basis, are: 17 to 48% $P_2O_5$; 0 to 40% $SiO_2$; 20 to 34% $Al_2O_3$; the total of these three major components being between 60% and 86% by weight of the glass and the ratio of $P_2O_5$ content to $Al_2O_3$ content being not less than 0.7; at least 10% $R_2O$ where R = K, Na or Li; 0.05 to 1.0% Ag; and 0.2 to 2% X where X = $Cl^-$, $Br^-$ or any combination of $Cl^-$, $Br^-$ and $I^-$. The glasses may also contain between 2 and 20 wt.% of a divalent oxide MO, or 2 to 25 wt.% MO where BaO or PbO is present. The glasses can be used for ophthalmic lenses for sunglasses, for example.

14 Claims, 1 Drawing Figure

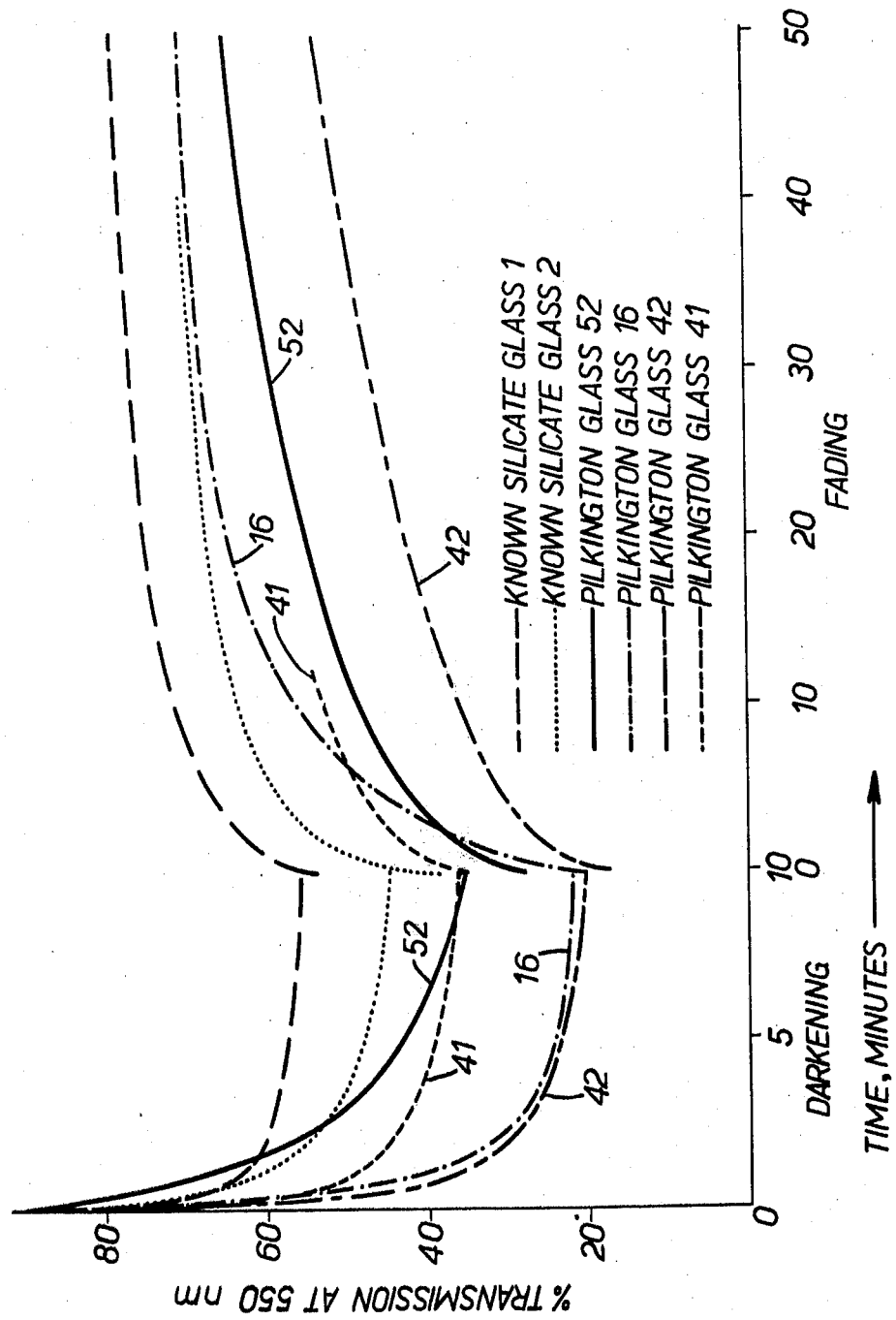

ALUMINO-PHOSPHATE PHOTOCHROMIC GLASSES

BACKGROUND OF THE INVENTION

1. Field of the Invention

This invention relates to photochromic glasses, i.e. to glass compositions which darken on exposure to actinic radiation and fade back to their original, normally colourless state when no longer exposed.

2. Description of the Prior Art

It is known that such photochromic glasses can be prepared by incorporating small quantities of microcrystalline silver halides in bodies of boro-silicate glasses. Alternative methods involve the formation on glass bodies of surface layers relatively rich in silver halide crystals, e.g., by ion exchange in a salt bath. While the precise mechanism which brings about the darkening is not fully understood, the effect is believed to be due to precipitation of silver halide crystals and the reversible conversion of silver ions to silver atoms during exposure to radiation. It has hitherto been thought unlikely that a substantial photochromic effect could be obtained in bodies of phosphate glasses, because the silver ion was known to be very stable in such glasses.

SUMMARY

According to the present invention, we provide a photochromic glass comprising at least 17% by weight $P_2O_5$ as one of the glass forming components, with silver halide crystals dispersed through the glass, the total silver content of the glass being at least 0.05% by weight Ag. The glass further comprises not more than 40% by weight $SiO_2$ and between 9% and 34% by weight $Al_2O_3$ as further glass forming components, and at least 10% by weight $R_2O$, where R = K, Na or Li.

The preferred compositional ranges for the photochromic phosphate glass according to the invention, in weight percentage on the oxide basis, are: 17 to 48% $P_2O_5$; 0 to 40% $SiO_2$; 20 to 34% $Al_2O_3$; the total of these three major components being between 60 and 86% by weight of the glass and the ratio of $P_2O_5$ content to $Al_2O_3$ content being not less than 0.7; at least 10% $R_2O$ where R = K, Na or Li; 0.05 to 1.0% Ag; and 0.2 to 2% X where X = $Cl^-$ or $Br^-$ or any combination of $Cl^-$, $Br^-$ and $I^-$.

The silver is expressed as part of the glass composition whereas the halide is added over and above the nominal 100% total of the other components.

Preferably the $SiO_2$ content is not more than 30 wt.% and in practice it usually does not exceed 20 wt.%.

The amount of $K_2O$ is preferably greater than 4% by weight of the glass.

The glass may further comprise $B_2O_3$ in an amount preferably not exceeding 19% by weight.

In certain areas within the broadest ranges quoted above, when $Al_2O_3$ is below 19 wt.%, there may be a risk of phase separation. In order to reduce this risk, we believe that it is necessary in such cases to ensure that $B_2O_3$ is present in excess of 10 wt.%.

It is desirable to include between 2% and 20% by weight MO where M = Mg, Ca, Sr, Ba, Zn, or Pb. The upper limit for MO may be raised to 25% where it includes BaO and/or PbO. The amount of MO may be made up from 0–8% MgO, 0–10% CaO, 0–8% SrO, 0–16% BaO, 0–8% ZnO and 0–20% PbO. A proportion of up to 4% by weight PbO is particularly convenient since it enables a photochromic glass to be produced having a refractive index of around 1.523 which is the standard value for ophthalmic glasses and thus facilitates the manufacture of spectacle lenses from the glass. Up to 2% by weight of fluorine (F) in the form of a metal fluoride may also be added to aid melting and the development of photochromicity. Minor amounts of copper oxides assist the development of photochromicity and increase the rate of fading. The glass accordingly preferably contains between 0.01% and 0.1% by weight of copper oxides, calculated as CuO. The copper oxides may be replaced by or combined with oxides of other elements which form reducing oxides, such as Fe, As, Sb, or Sn, in similar quantities, but in general the rate of fading is not then so rapid. If iron oxides are used, the amount should not exceed 0.2% to avoid discolouration of the glass.

Further modifying components, for adjustment of refractive index, may include up to 4 wt.% $TiO_2$ or $ZrO_2$, though care must be taken to avoid formation of the purple colour which can be caused in phosphate glasses by $TiO_2$. As an ultra-violet absorber, up to 3 wt.% $CeO_2$ may be included. Tinting agents may also be added in known manner.

A trace of $Ag_2S$ (up to 0.02 wt.%) has also been found to increase the sensitivity of the glass to radiation, particularly visible radiation.

Such glasses have been found to produce substantial photochromic effects, and the stability of the $Ag^+$ ion in phosphate glasses proves to be an advantage in that it makes manufacture of the glass simpler than with certain other glasses in which the $Ag^+$ ion is unstable.

In most cases, the photochromic effect can be enhanced by heat treatment of the glass, the appropriate heat treatment schedule being primarily determined by the viscosity-temperature relationship of the particular glass. In general, the heat treatment temperature lies between the strain point and the softening point of the glass, the heat treatment time required being several hours at the lower temperature but only a few minutes at the higher temperature. At the higher temperature, however, deformation and clouding of the glass may occur, so it is preferred for convenience to use a temperature 20° to 100° C above the annealing point and a heat treatment time of 10 to 60 minutes. The schedule may be imposed on the glass directly after forming or the glass may be annealed and cooled to room temperature before heat treatment. The cooling rate to which the glass is subjected after heat treatment is sometimes found to have an effect on the photochromic properties of the final product. Thus a glass which is removed immediately from the heat treatment zone, being effectively quenched, may exhibit slower fading characteristics than the same glass cooled at 1–2° C $min^{-1}$ to a temperature of 400° C. This cannot be stated as a general rule however and must be determined by experimentation on individual glasses.

The exact temperature/time schedule imposed on a glass is ultimately determined by the concentrations of photochromic agents in the glass and the photochromic property requirements of the final product. In general, the higher the levels of the components contributing to the photochromism the shorter will be the heat treatment schedule and in some cases, the photochromism may develop during cooling from the melt or annealing of the glass. The fading rate of the glass, in general, increases with heat treatment time at a particular temperature, reaching some maximum value and then decreasing for longer times. Excessively long heat treatments may also lead to some clouding of the glass.

DESCRIPTION OF THE PREFERRED EMBODIMENTS

Specific embodiments of the invention will now be described in more detail by way of example, and with reference to the accompanying drawing, which illustrates graphically the darkening and fading characteristics of several glasses.

Table 1 gives sixty examples of glass compositions in accordance with the invention, while Table 2 gives examples of heat treatments for fourteen of these compositions, and the resulting photochromic effects in terms of initial and final percentage light transmission before and after irradiation for four minutes with ultraviolet light from a 90 watt mercury vapour lamp, used with an OX7 filter resulting in a transmission from 320 to 500 nm, with the maximum transmission in the range 360 to 460 nm. Table 2 also gives the half-darkening time (t½d) on irradiation and the half-fading time (t½f) on removal of the radiation. Results obtained with two known photochromic silicate-based glasses are included in Table 2 for comparison.

The accompanying drawing shows the darkening and fading characteristics, measured using a 150 watt xenonarc lamp which gives a spectrum approximating to that of sunlight, and plotted as percentage light transmission against time, for glasses 16, 41, 42 and 52 of Table 1, compared with the two known silicate-based glasses referred to above.

The compositions listed in Table 1 can be made up in the following manner. The batch is melted under oxidising or neutral conditions at a temperature in the range 1,200° to 1,600° C, and after cooling is annealed at a temperature between 450° and 650° C. A final heat treatment may subsequently be effected at between 20° and 100° C above the annealing point for a period of 10 to 60 minutes. The optimum heat treatment temperature range for a particular glass may be determined by a gradient furnace technique. In some cases, it may be necessary to support the glass during heat treatment to avoid sagging.

The batches can be made up from conventional glassmaking raw materials, such as carbonates, meta-or orthophosphates, nitrates and oxides. The silver and halide components may be added to the batches in the form of finely-ground silver nitrate ($AgNO_3$) and sodium or potassium halides, respectively.

precautions are required during melting to minimise volatilisation losses of batch components. Up to 60% of the halide components and 30% of the silver may be lost in this way and the necessary allowances are required during batch preparation.

Referring to Table 2, it will be seen from the different results obtained by different heat treatments of glass No. 18, that the photochromic effect depends to a considerable extent on the heat treatment given to the glass. The optimum heat treatment in any given case will depend on the particular requirements relating to light transmission and darkening and fading times, and can readily be determined by experiment.

It will be seen from Table 2 and the accompanying drawing that the photochromic phosphate glasses of the present invention generally compare favourably with the known silicate-based glasses, particularly as regards the degree of darkening while the rate of darkening is also generally more rapid. In this connection, the half-darkening times are not wholly comparable with those of the known glasses because the degree of full darkening is so much greater.

The glasses have attractive colours when darkened and are accordingly useful for ophthalmic lenses for sunglasses. They can be made with a refractive index ($n_D$) of 1.523 (for example glasses 41 to 43 and 60) which makes them particularly useful for this purpose. The photochromic properties of the glasses are substantially unaffected by temperature changes over the range of ambient atmospheric temperatures normally encountered, which gives the glasses an advantage over the presently available silicate-based photochromic glasses.

TABLE 1. EXAMPLES OF PHOTOCHROMIC GLASS COMPOSITIONS

| Glass No. | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Component | | | | | | | | | | | | | | | |
| $P_2O_5$ | 32.2 | 34.6 | 38.6 | 38.8 | 38.5 | 42.5 | 38.6 | 38.6 | 38.6 | 28.6 | 23.7 | 31.6 | 41.7 | 35.6 | 34.6 |
| $Al_2O_3$ | 25.4 | 25.4 | 25.4 | 25.6 | 25.4 | 25.4 | 25.4 | 25.4 | 25.4 | 25.4 | 25.4 | 29.4 | 25.4 | 25.4 | 25.4 |
| $SiO_2$ | 21.1 | 18.8 | 14.8 | 14.9 | 14.8 | 10.9 | 14.8 | 14.8 | 14.8 | 24.7 | 29.6 | 17.8 | 14.8 | 14.8 | 14.8 |
| $MgO$ | 4.3 | 4.2 | 4.2 | 4.3 | 4.2 | 4.2 | – | – | – | 4.2 | 4.2 | 4.2 | 4.2 | 4.4 | 8.2 |
| $B_2O_3$ | 3.2 | 3.2 | 3.2 | 3.2 | 3.2 | 3.2 | 3.2 | 3.2 | 3.2 | 3.2 | 3.2 | 3.2 | – | 6.1 | 3.2 |
| $K_2O$ | 12.6 | 12.7 | 12.7 | 4.0 | 7.9 | 12.6 | 12.7 | 12.7 | 12.7 | 12.6 | 12.6 | 12.6 | 12.8 | 12.6 | 12.7 |
| $Na_2O$ | 0.7 | 0.7 | 0.7 | 8.8 | 0.7 | 0.7 | 0.7 | 0.7 | 0.7 | 0.7 | 0.7 | 0.7 | 0.7 | 0.7 | 0.7 |
| $Li_2O$ | – | – | – | – | 4.8 | – | – | – | – | – | – | – | – | – | – |
| $Ag$ | 0.48 | 0.38 | 0.38 | 0.38 | 0.48 | 0.48 | 0.38 | 0.38 | 0.38 | 0.58 | 0.58 | 0.48 | 0.38 | 0.38 | 0.38 |
| $CuO$ | 0.02 | 0.02 | 0.02 | 0.02 | 0.02 | 0.02 | 0.02 | 0.02 | 0.02 | 0.02 | 0.02 | 0.02 | 0.02 | 0.02 | 0.02 |
| $CaO$ | – | – | – | – | – | – | 4.2 | – | – | – | – | – | – | – | – |
| $BaO$ | – | – | – | – | – | – | – | 4.2 | – | – | – | – | – | – | – |
| $SrO$ | – | – | – | – | – | – | – | – | 4.2 | – | – | – | – | – | – |
| $PbO$ | – | – | – | – | – | – | – | – | – | – | – | – | – | – | – |
| $ZnO$ | – | – | – | – | – | – | – | – | – | – | – | – | – | – | – |
| $F$ | 0.20 | 0.25 | 0.25 | 0.20 | 0.2 | 0.2 | 0.2 | 0.2 | 0.2 | 0.30 | 0.30 | 0.30 | 0.20 | 0.20 | 0.25 |
| $Cl$ | 0.70 | 0.65 | 0.65 | 0.70 | 0.7 | 0.7 | 0.7 | 0.7 | 0.7 | 0.60 | 0.60 | 0.60 | 0.65 | 0.60 | 0.70 |
| $Br$ | – | – | – | – | – | – | – | – | – | – | – | – | – | – | – |
| $I$ | – | – | – | – | – | – | – | – | – | – | – | – | – | – | – |

TABLE 1 Cont'd

| Glass No. | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|
| Component | | | | | | | | | | | | | | | |
| $P_2O_5$ | 36.4 | 36.4 | 36.4 | 36.4 | 32.2 | 32.2 | 36.2 | 24.4 | 17.0 | 34.6 | 34.6 | 36.4 | 19.0 | 48.0 | 25.2 |
| $Al_2O_3$ | 25.3 | 25.3 | 25.3 | 25.3 | 25.4 | 25.4 | 33.6 | 34.0 | 22.0 | 25.4 | 25.4 | 25.3 | 25.0 | 22.7 | 25.4 |
| $SiO_2$ | 14.9 | 14.9 | 14.9 | 14.9 | 21.1 | 21.1 | 9.0 | 20.4 | 40.0 | 14.8 | 14.8 | 14.9 | 35.0 | 9.0 | 21.2 |
| $MgO$ | 4.3 | 4.3 | 4.3 | 4.3 | 4.3 | 4.3 | 4.2 | 4.2 | 4.2 | – | – | 4.3 | 4.1 | 4.2 | 4.1 |
| $B_2O_3$ | 3.2 | 3.2 | 3.2 | 3.2 | 3.2 | 3.2 | 3.1 | 3.2 | 3.2 | 3.2 | 3.2 | 3.2 | 3.1 | 3.2 | 3.2 |
| $K_2O$ | 14.9 | 14.9 | 14.9 | 14.9 | 12.6 | 12.8 | 12.6 | 12.5 | 12.3 | 13.0 | 13.0 | 14.9 | 12.5 | 12.6 | 19.8 |
| $Na_2O$ | 0.7 | 0.7 | 0.7 | 0.7 | 0.7 | 0.7 | 0.7 | 0.7 | 9.7 | 0.7 | 0.7 | 0.7 | 0.7 | – | 0.7 |
| $Li_2O$ | – | – | – | – | – | – | – | – | – | – | – | – | – | – | – |
| $Ag$ | 0.28 | 0.28 | 0.28 | 0.28 | 0.46 | 0.26 | 0.56 | 0.56 | 0.56 | 0.38 | 0.38 | 0.28 | 0.56 | 0.28 | 0.38 |
| $CuO$ | 0.02 | 0.02 | 0.02 | 0.02 | 0.04 | 0.04 | 0.04 | 0.04 | 0.04 | 0.02 | 0.02 | 0.02 | 0.04 | 0.02 | 0.02 |
| $CaO$ | – | – | – | – | – | – | – | – | – | – | – | – | – | – | – |
| $BaO$ | – | – | – | – | – | – | – | – | – | – | – | – | – | – | – |
| $SrO$ | – | – | – | – | – | – | – | – | – | – | – | – | – | – | – |
| $PbO$ | – | – | – | – | – | – | – | – | – | 7.9 | – | – | – | – | – |
| $ZnO$ | – | – | – | – | – | – | – | – | – | – | 7.9 | – | – | – | – |
| F | 0.25 | 0.25 | 0.25 | 0.25 | 0.20 | 0.20 | 0.20 | 0.20 | 0.20 | 0.20 | 0.25 | 0.20 | 0.20 | – | 0.2 |
| Cl | 0.70 | 0.70 | 0.70 | – | 0.70 | 0.70 | 0.70 | 0.70 | 0.70 | 0.70 | 0.60 | 0.50 | 0.70 | 0.5 | 0.7 |
| Br | – | 0.30 | – | 0.80 | – | – | – | – | – | – | – | – | – | – | – |
| I | – | – | 0.40 | – | – | – | – | – | – | – | – | – | – | – | – |

TABLE 1 Cont'd

| Glass No. | 31 | 32 | 33 | 34 | 35 | 36 | 37 | 38 | 39 | 40 | 41 | 42 | 43 |
|---|---|---|---|---|---|---|---|---|---|---|---|---|---|
| Component | | | | | | | | | | | | | |
| $P_2O_5$ | 36.8 | 37.0 | 37.0 | 35.5 | 36.4 | 36.4 | 36.4 | 36.4 | 36.4 | 34.6 | 36.7 | 36.7 | 34.7 |
| $Al_2O_3$ | 21.0 | 21.5 | 22.7 | 21.0 | 25.3 | 25.3 | 25.3 | 25.3 | 25.3 | 24.8 | 22.7 | 22.7 | 24.7 |
| $SiO_2$ | 8.0 | 7.5 | 7.0 | 8.5 | 14.9 | 14.9 | 14.9 | 14.9 | 14.9 | 8.7 | 7.5 | 7.5 | 7.5 |
| MgO | 4.2 | 4.3 | 2.0 | 2.0 | 4.3 | 4.3 | 4.3 | 4.3 | 4.3 | 3.2 | – | – | – |
| $B_2O_3$ | 1.2 | – | 2.5 | 4.0 | 3.2 | 3.2 | 3.2 | 3.2 | 3.2 | – | 3.2 | 3.2 | 3.9 |
| $K_2O$ | 9.0 | 7.0 | 9.0 | 9.0 | 14.9 | 14.9 | 14.9 | 14.9 | 14.9 | 7.9 | 8.0 | 8.0 | 8.0 |
| $Na_2O$ | 6.0 | 6.0 | 6.0 | 6.0 | 0.85 | 0.85 | 0.85 | 0.85 | 0.85 | 6.6 | 6.0 | 6.0 | 6.0 |
| Ag | 0.05 | 0.06 | 0.18 | 0.07 | 0.13 | 0.13 | 0.13 | 0.13 | 0.13 | 0.11 | 0.07 | 0.07 | 0.07 |
| CuO | 0.02 | 0.02 | 0.02 | 0.02 | 0.02 | 0.02 | 0.02 | 0.02 | 0.02 | 0.02 | 0.02 | 0.04 | 0.03 |
| CaO | 7.5 | 9.0 | 7.5 | 7.7 | – | – | – | – | – | 7.0 | 5.5 | 5.5 | 4.8 |
| BaO | 4.3 | 6.7 | 4.3 | 4.3 | – | – | – | – | – | 6.6 | 5.3 | 5.3 | 5.3 |
| $ZrO_2$ | 0.93 | – | 0.8 | 0.91 | – | – | – | – | – | – | 2.0 | 2.0 | 2.0 |
| $TiO_2$ | 1.0 | 0.92 | 1.0 | 1.0 | – | – | – | – | – | 0.47 | 1.01 | 0.99 | 1.0 |
| PbO | – | – | – | – | – | – | – | – | – | – | 2.0 | 2.0 | 2.0 |
| F | 0.13 | 0.13 | 0.13 | 0.13 | 0.25 | 0.25 | 0.25 | 0.25 | 0.20 | 0.4 | 0.22 | 0.22 | 0.22 |
| Cl | 0.6 | 0.5 | 0.4 | 0.6 | 0.70 | 0.70 | 0.70 | – | 0.50 | 0.5 | 0.70 | 0.70 | 0.70 |
| Br | 0.12 | 0.2 | 0.1 | – | – | 0.30 | – | 0.80 | – | 0.2 | 0.20 | 0.20 | 0.20 |
| I | – | – | – | – | – | – | 0.40 | – | – | – | – | – | – |

TABLE 1 Cont'd

| Glass No. | 44 | 45 | 46 | 47 | 48 | 49 | 50 | 51 | 52 | 53 | 54 | 55 | 56 |
|---|---|---|---|---|---|---|---|---|---|---|---|---|---|
| Component | | | | | | | | | | | | | |
| $P_2O_5$ | 35.3 | 35.0 | 41.2 | 36.8 | 37.1 | 27.9 | 28.1 | 30.1 | 36.7 | 35.6 | 33.6 | 36.6 | 32.6 |
| $Al_2O_3$ | 21.8 | 21.7 | 26.2 | 23.0 | 23.2 | 20.0 | 20.2 | 21.6 | 22.7 | 22.1 | 24.1 | 26.3 | 25.7 |
| $SiO_2$ | 6.3 | 4.9 | – | 3.8 | 2.7 | 11.8 | 11.9 | 11.7 | 8.5 | 7.3 | 7.3 | – | 21.4 |
| MgO | – | 1.86 | – | 1.86 | 1.46 | – | – | – | – | – | – | – | 4.3 |
| $B_2O_3$ | 3.4 | 3.9 | 2.8 | 4.4 | 5.5 | 3.16 | 2.6 | 7.0 | 3.17 | 3.07 | 3.07 | 18.6 | 3.2 |
| $K_2O$ | 9.0 | 9.0 | 8.8 | 8.8 | 8.7 | 13.4 | 19.2 | 7.7 | 9.0 | 10.0 | 10.0 | 1.61 | 12.8 |
| $Na_2O$ | 6.0 | 6.7 | 6.6 | 6.0 | 6.0 | – | – | 5.26 | 6.0 | 6.5 | 6.5 | 16.7 | – |
| Ag | 0.084 | 0.084 | 0.084 | 0.084 | 0.084 | 0.094 | 0.094 | 0.094 | 0.094 | 0.094 | 0.094 | 0.091 | 0.5 |
| CuO | 0.016 | 0.036 | 0.036 | 0.036 | 0.036 | 0.036 | 0.036 | 0.036 | 0.036 | 0.036 | 0.036 | 0.039 | 0.02 |
| CaO | 5.2 | – | 5.0 | – | – | – | – | – | 6.5 | 5.3 | 5.3 | – | – |
| BaO | 5.0 | 11.6 | 4.8 | 11.2 | 11.1 | 13.6 | 14.4 | – | 5.3 | 5.2 | 5.2 | – | – |
| $ZrO_2$ | – | 3.2 | 1.8 | – | – | – | 3.46 | – | – | 1.9 | 1.9 | – | – |
| $TiO_2$ | – | – | 0.86 | – | – | – | – | – | 2.0 | 1.0 | 1.0 | – | – |
| PbO | 7.9 | 2.0 | 1.8 | 4.0 | 4.1 | 10.0 | – | 16.5 | – | 1.9 | 1.9 | – | – |
| $Fe_2O_3$ | – | 0.02 | 0.02 | 0.02 | 0.02 | 0.01 | 0.01 | 0.01 | – | – | – | 0.02 | – |
| F | 0.47 | 0.47 | 0.04 | 0.47 | 0.47 | 0.47 | 0.47 | 0.47 | 0.47 | 0.47 | 0.47 | 0.47 | 0.2 |
| Cl | 0.47 | 0.47 | 0.47 | 0.47 | 0.47 | 0.47 | 0.47 | 0.47 | 0.47 | 0.47 | 0.47 | 0.47 | 0.7 |
| Br | 0.35 | 0.35 | 0.35 | 0.35 | 0.35 | 0.35 | 0.35 | 0.35 | 0.35 | 0.35 | 0.35 | 0.35 | – |

TABLE 1 Cont'd

| Glass No. | 57 | 58 | 59 | 60 |
|---|---|---|---|---|
| Component | | | | |
| $P_2O_5$ | 34.8 | 35.5 | 36.2 | 34.2 |
| $Al_2O_3$ | 19.0 | 14.1 | 9.1 | 24.2 |
| $SiO_2$ | 7.5 | 7.64 | 7.75 | 0 |
| $B_2O_3$ | 7.6 | 11.0 | 14.7 | 16.7 |
| $K_2O$ | 9.9 | 10.1 | 10.2 | 8.14 |
| $Na_2O$ | 6.0 | 6.1 | 6.2 | 6.38 |
| Ag | 0.08 | 0.081 | 0.083 | 0.079 |
| CuO | 0.04 | 0.042 | 0.041 | 0.039 |
| CaO | 4.9 | 5.0 | 5.06 | 4.42 |
| BaO | 5.2 | 5.4 | 5.5 | 0 |
| $ZrO_2$ | 2.0 | 2.04 | 2.07 | 2.94 |
| $TiO_2$ | 1.0 | 1.0 | 1.0 | 2.94 |
| PbO | 2.0 | 2.0 | 2.1 | 0 |
| F | 0.47 | 0.47 | 0.47 | 0.47 |
| Cl | 0.47 | 0.47 | 0.47 | 0.47 |
| Br | 0.35 | 0.35 | 0.35 | 0.35 |
| $n_D$ | – | – | – | 1.523 |

TABLE 2

EXAMPLES OF HEAT TREATMENT SCHEDULES AND PHOTOCHROMIC PROPERTIES

| Glass No. | Heat Treatment | Initial Trans. % | Final Trans. % | t½d(sec) | t½f(sec) |
|---|---|---|---|---|---|
| 1 | 60 min at 620°C | 85 | 55 | 24 | 300 |
| 3 | 30 min at 500°C | 88 | 61 | 8 | 30 |
| 14 | 30 min at 515°C | 64 | 46 | 3 | 11 |
| 16 | 30 min at 510°C | 84 | 54 | 54 | 108 |
| 17 | 20 min at 570°C | 88 | 48 | 12 | 150 |
| 18 | 5 min at 600°C | 90 | 50 | 8 | 165 |
| 18 | 30 min at 550°C | 88 | 39 | 13.6 | 240 |
| 19 | 5 min at 600°C | 86 | 41 | 12 | 78 |
| 20 | 15 min at 575°C | 88 | 54 | 9 | 180 |
| 22 | 20 min at 600°C | 86 | 60 | 9 | 180 |
| 41 | 60 min at 560°C | 88 | 50 | 12 | 240 |
| 42 | 30 min at 560°C | 84 | 46 | 18 | 240 |
| 45 | 30 min at 530°C | 86.5 | 62.5 | 36 | 210 |
| 46 | 30 min at 550°C | 88 | 62 | 24 | 180 |
| 52 | 15 min at 560°C | 90 | 63 | 54 | 384 |
| Known silicate glass 1 | — | 91 | 63.5 | 30 | 132 |
| Known silicate glass 2 | — | 86.5 | 61 | 30 | 96 |

In one further specific example, a batch of glass 56, which is somewhat similar to glass 1, was melted at 1,580°C in an electric furnace. The glass was cast into 25 mm squares approximately 6 mm in thickness and allowed to cool for about 1 – 2 mins. The sample was placed in a muffle furnace at 620°C and held for 1 hour and then cooled. After this treatment the sample was partially phase-separated having an initial transmission of 55%. On irradiation with ultra-violet radiation the transmission decreased to a steady value of 24%. On removal of the radiation the transmission of the sample began to return to its initial value. The half-darkening time was 9 secs. and the half-fading time 42 secs.

The above glass, melted under the same conditions but cast into a 50 mm square 66 mm in thickness, was allowed to cool for 1 – 2 mins. before annealing at 520°C for 1 hour. The glass was then heat treated at 620°C for 1 hour. The initial transmission of the glass was 72% and on irradiation decreased to 40%. The half-darkening time was 27 secs. and the half-fading time about 300 secs.

I claim:

1. A photochromic alumino-phosphate glass comprising at least 17% by weight $P_2O_5$, 9% to 34% by weight $Al_2O_3$, not more than 40% by weight $SiO_2$, not more than 19% by weight $B_2O_3$, and at least 10% by weight $R_2O$ where R = K, Na or Li, with silver halide crystals dispersed through the glass, the total silver content of the glass being at least 0.05% by weight Ag.

2. A glass according to claim 1, containing less than 19 wt.% $Al_2O_3$ and more than 10 wt.% $B_2O_3$.

3. A photochromic alumino-phosphate glass comprising in weight percentage, on the oxide basis: 17 to 48% $P_2O_5$; 0 to 40% $SiO_2$; 20 to 34% $Al_2O_3$; the total of these three major components being between 60% and 86% by weight of the glass and the ratio of $P_2O_5$ content to $Al_2O_3$ content being not less than 0.7; at least 10% $R_2O$ where R = K, Na or Li; 0.05 to 1.0% Ag; and 0.2 to 2% X where X = $Cl^-$, $Br^-$ or any combination of $Cl^-$, $Br^-$ and $I^-$.

4. A glass according to claim 3, wherein the $SiO_2$ content is not more than 30 wt.%.

5. A glass according to claim 3, wherein the amount of $K_2O$ is greater than 4% by weight of the glass.

6. A glass according to claim 3, further comprising $B_2O_3$ in an amount not exceeding 19% by weight.

7. A glass according to claim 3, further comprising between 2% and 20% by weight MO where M = Mg, Ca, Sr, Ba, Zn, or Pb, and between 2% and 25% MO where BaO and/or PbO is present.

8. A glass according to claim 7, wherein the amount of MO is made up from 0–8% MgO, 0–10% CaO, 0–8% SrO, 0–16% BaO, 0–8% ZnO and 0 to 20% PbO.

9. A glass according to claim 3, further comprising up to 2% by weight F in the form of a metal flouride.

10. A glass according to claim 3, containing between 0.01% and 0.1% by weight of copper oxides, calculated as CuO.

11. A glass according to claim 3, containing not more than 0.2% by weight of iron oxides, calculated as $Fe_2O_3$.

12. A glass according to claim 3, containing up to 4% by weight of $TiO_2$.

13. A glass according to claim 3, containing up to 4% by weight of $ZrO_2$.

14. A glass according to claim 3, containing up to 0.02% by weight of $Ag_2S$.

* * * * *